United States Patent [19]

Kuroda

[11] Patent Number: 5,369,653
[45] Date of Patent: Nov. 29, 1994

[54] SONET TRANSMISSION SIGNAL PROCESSING METHOD AND SONET TRANSMISSION SIGNAL PROCESSING APPARATUS

[75] Inventor: Yoshihide Kuroda, Tokyo, Japan
[73] Assignee: NEC Corporation, Japan
[21] Appl. No.: 932,629
[22] Filed: Aug. 20, 1992

[30] Foreign Application Priority Data

Aug. 21, 1991 [JP] Japan ................. 3-234006

[51] Int. Cl.⁵ .................. H04J 3/00; G02F 1/00
[52] U.S. Cl. .................. 371/67.1; 370/55; 370/84; 371/25.1; 371/21.2
[58] Field of Search .......... 371/67.1, 8.1, 8.2, 371/24, 37.7, 492, 48, 25.1, 21.2; 395/135; 370/55, 84, 13, 60, 105.1, 77, 110.1

[56] References Cited

U.S. PATENT DOCUMENTS

| | | | |
|---|---|---|---|
| 3,982,226 | 9/1976 | Bunker et al. | 340/146.1 AL |
| 4,847,753 | 7/1989 | Matsuo | 364/200 |
| 5,185,736 | 2/1993 | Tyrrell et al. | 370/55 |
| 5,210,761 | 5/1993 | Fukami et al. | 371/40.1 |
| 5,210,762 | 5/1993 | Weeber et al. | 371/69.1 |

Primary Examiner—Robert W. Beausoliel, Jr.
Assistant Examiner—Dieu-Minh Le
Attorney, Agent, or Firm—Ostrolenk, Faber, Gerb & Soffen

[57] ABSTRACT

A VT (Virtual Tributary) size setting section 3 allows selection of the VT size desired by the user of the apparatus by accepting setting data inputted by the user of the apparatus. The VT size comparing section 4 compares the VT size detected at the VT size receiving section 2 with the VT size set by the VT size setting section 3 in order to detect coincidence or noncoincidence. The data outputting section 5 executes the predetermined data processing of data extracted from a SONET (Synchronous Optical Network) transmission signal in accordance with the VT size set by the VT size setting section 3 when the result of the comparison at the VT size comparing section 4 indicates coincidence, but executes error signal processing when the result of comparison at the VT size comparing section 4 indicates noncoincidence.

8 Claims, 11 Drawing Sheets

FIG. 6
PRIOR ART

SONET TRANSMISSION SIGNAL PROCESSING METHOD AND SONET TRANSMISSION SIGNAL PROCESSING APPARATUS

BACKGROUND OF THE INVENTION

This invention relates to a SONET (Synchronous Optical Network) transmission signal processing method and a SONET transmission signal processing apparatus.

A SONET transmission signal has a data transmission rate of 51.840 Mb/sec. Referring to FIG. 1, one frame of the SONET transmission signal is formed from data of 90 columns×9 rows in units of 1 byte (8 bits), that is, data totaling 810 bytes (6,480 bits). Accordingly, the SONET transmission signal has a frame length of 125 μs.

One frame of a SONET transmission signal is divided into transport overhead A and synchronization payload envelope capacity B for transmission of the information payload. Transport overhead A is formed from the first three columns and has 9 bytes×3 columns=27 bytes allotted to it. Meanwhile, synchronization payload envelope capacity B is formed from the remaining 87 columns and has 9 bytes×87 columns=783 bytes allotted to it. Referring to FIG. 2, the first column of synchronization payload envelope capacity B is used as a pass overhead (POH), and the remaining 86 columns of synchronization payload envelope capacity B are used as payload capacity (the portion which substantially transmits the payload).

Data of the following four virtual tributary sizes (hereinafter referred to as "VT sizes") are accommodated in synchronization envelope capacity B:

(1) data of the VT 1.5 size (data transmission rate=1.728 Mb/s), (2) data of the VT 2 size (data transmission rate=2.304 Mb/s), (3) data of the VT 3 size (data transmission rate=3.456 Mb/s), and (4) data of the VT 6 size (data transmission rate=6.912 Mb/s).

In order for data to be accommodated efficiently in synchronization payload envelope capacity B, synchronization payload envelope capacity B is divided into three blocks each including 29 columns as shown in FIG. 3, and fixed stuff formed from one column is inserted into the 30th and 59th columns. Further, data is accommodated into the 84 columns of the blocks (except for the POH and the two units of fixed stuff) in the following manner in accordance with the VT sizes.

(1) When the VT size is 1.5, four columns are allotted as one VT group, and the data is accommodated in synchronization payload envelope capacity B in units of 7 VT groups (4 columns×7=28 columns). For example, if the VT sizes of all data accommodated in synchronization payload envelope capacity B are equal and 1.5, as shown in FIG. 4, the first unit is accommodated in the second to the 29th columns (i.e., between the POH and the first unit of fixed stuff); the second unit is accommodated in the 31st to 58th columns (i.e., between the first and second units of stuff); and the third unit is accommodated in the 60th to 87th columns (i.e., in the columns following the second unit of fixed stuff).

(2) When the VT size is 2, three columns are allotted as one VT group, and the data is accommodated in synchronization payload envelope capacity B in units of 7 VT groups (3 columns×7=21 columns). For example, if the VT sizes of all data accommodated in synchronization payload envelope capacity B are equal and 2, as shown in FIG. 5, the first unit (21 columns) is accommodated in the second to the 22nd column, the first 7 columns of the second unit are accommodated in the 23rd to 29th columns and the remaining 14 columns of the second unit are accommodated in the 31st to 44th columns, the first 14 columns of the third unit are accommodated in the 45th to 58th columns and the remaining 7 columns of the third unit are accommodated in the 60th to 66th columns, and the fourth unit is accommodated in the 67th to 87th columns.

(3) When the VT size is 3, two columns are allotted as one VT group and the data is accommodated in synchronization payload envelope capacity B in units of 7 VT groups (2 columns×7=14 columns). For example, if the VT sizes of all data accommodated in synchronization payload envelope capacity B are equal and 3, as shown in FIG. 6, the first and second units are accommodated in the second to the 29th columns (i.e., between the POH and the first unit of fixed stuff), the third and fourth units are accommodated in the 31st to 58th columns (i.e., between the first and second units of fixed stuff), and the fifth and sixth units are accommodated in the 60th to 87th columns (i.e., in the columns following the second unit of fixed stuff).

(4) When the VT size is 6, one column is allotted as one group, and the data is accommodated in synchronization payload envelope capacity B in the units of 7 VT groups (1 column×7=7 columns). For example, if the VT sizes of all data accommodated in synchronization payload envelope capacity B are equal and 6, as shown in FIG. 7, the units from the first to the fourth are accommodated in the second to the 29th columns (i.e., between the POH and the first unit of fixed stuff), the units from the fifth to the eighth unit are accommodated in the 31st to 58th columns (i.e., between the first and second units of fixed stuff), and the units from the ninth to the twelfth unit are accommodated in the 60th to 87th columns (i.e., in the columns succeeding the second unit of fixed stuff).

Since the SONET transmission signal is permitted to assume any one of the four VT sizes according to the format of the SONET transmission signal, a SONET transmission signal processing apparatus must necessarily specify the VT size of the SONET transmission signal. A method of specifying the VT size of the SONET transmission signal in the SONET transmission signal processing apparatus is briefly described below.

(1) If the VT sizes of all data accommodated in synchronization payload envelope capacity B are equal to 1.5, as shown in FIG. 4, the value "11," which is VT size information representing VT size=1.5, is placed into two predetermined bits of each first byte (indicated as "Byte 1" in FIG. 4) of the first unit, and the SONET transmission signal including the VT size information is transmitted to the SONET transmission signal processing apparatus.

(2) If the VT sizes of all data accommodated in synchronization payload envelope capacity B are processing apparatus detects the VT size from the data of the two predetermined bits of each first bytes of the first unit.

However, since a conventional SONET transmission signal processing apparatus operates in accordance with the VT size detected in accordance with the method described above from a SONET transmission signal transmitted to the apparatus, there is a problem that the apparatus may not operate, depending upon a SONET transmission signal received, with the VT size the user desires, and consequently, the reliability of the output signal of the SONET transmission signal processing apparatus is low. Further, when the data of the two predetermined bits representing the VT size is transmitted to the apparatus contains an error due to trouble in the transmission line or at the transmitter side, the SONET transmission signal processing apparatus operates in accordance with the wrong VT size. This factor also results in the decreased reliability of the SONET transmission signal processing apparatus.

SUMMARY OF THE INVENTION

An object of the present invention is to provide a SONET transmission signal processing method and a SONET transmission signal processing apparatus wherein the SONET transmission signal processing equal to 2, as shown in FIG. 5, the value "10," which is VT size information representing VT size=2, is placed into two predetermined bits of each first byte (indicated as "Byte 1" in FIG. 5) of the first unit, and the SONET transmission signal including the VT size information is transmitted to the SONET transmission signal processing apparatus.

(3) If the VT sizes of all data accommodated in synchronization payload envelope capacity B are equal to 3, as shown in FIG. 6, the value "01," which is VT size information representing VT size=3, is placed into two predetermined bits of each first byte (indicated as "Byte 1" in FIG. 6) of the first unit, and the SONET transmission signal including the VT size information is transmitted to the SONET transmission signal processing apparatus.

(4) If the VT sizes of all data accommodated in synchronization payload envelope capacity B are equal to 6, as shown in FIG. 7, the value "00," which is VT size information representing VT size=6 is placed into two predetermined bits of each first byte (indicated as "Byte 1" in FIG. 7) of the first unit, and the SONET transmission signal including the VT size information is transmitted to the SONET transmission signal processing apparatus.

Thus, the SONET transmission signal apparatus operates regularly only when the VT size detected from a received SONET transmission signal coincides with the VT size set by the user of the apparatus, thereby enhancing the reliability of the output signal.

Other objects of the present invention will become obvious from the following description.

In accordance with an aspect of the present invention, there is provided a method of both receiving a SONET transmission signal wherein synchronization payload envelope capacity has a first column including data and a first byte which includes bits indicating the VT size of the data and a second column including only data, and of performing predetermined signal processing of the data included in the first and second columns, comprising the steps of: setting a desired VT size from the outside, detecting the first byte included in the first column, detecting the VT size of the data included in the first column from the first detected byte, comparing the detected VT size with the desired VT size, and either executing the predetermined signal processing of the data included in the first and second columns in accordance with the desired VT size when the result of comparison indicates coincidence, or executing error signal processing of the data included in the first and second columns when the result of the comparison indicates noncoincidence.

In accordance with an aspect of the present invention, there is also provided a SONET transmission signal processing apparatus which both receives a SONET transmission signal wherein synchronization payload envelope capacity has a first column including data and a first byte which includes bits indicating the VT size of the data and a second column including only data, and performs predetermined signal processing of the data included in the first and second columns and which comprises: VT size setting means for setting a desired VT size from the outside, VT size detecting means for detecting the first byte included in the first column and detecting the VT size of the data included in the first column from the detected first byte, comparison means for comparing the VT size detected by the VT size detecting means with the desired VT size set by the VT size setting means, and data outputting means for executing the predetermined signal processing of the data included in the first and second columns in accordance with the desired VT size set by the VT size setting means when the output signal of the comparison means indicates coincidence, and for executing error signal processing of the data included in the first and second columns when the output signal of the comparison means indicates noncoincidence.

BRIEF DESCRIPTION OF THE DRAWINGS

The features and advantages of the present invention will become apparent from the following description when taken in conjunction with the accompanying drawings in which:

Figure 6:
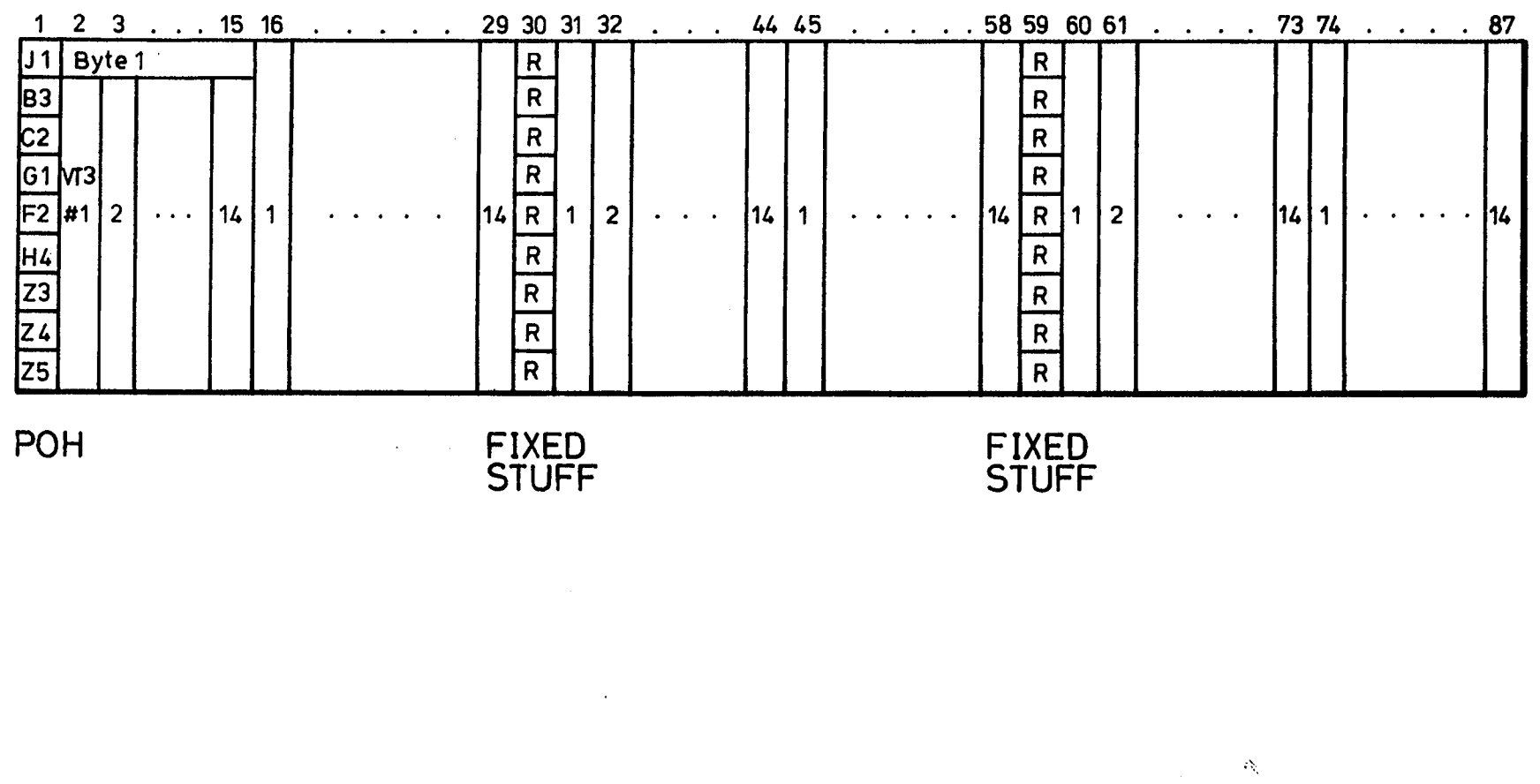

FIG. 6 is a similar view but illustrating another manner in which data is accommodated within the synchronization payload envelope capacity when the VT sizes of all data are equal to 3.

DESCRIPTION OF THE PREFERRED EMBODIMENT

Figure 8:
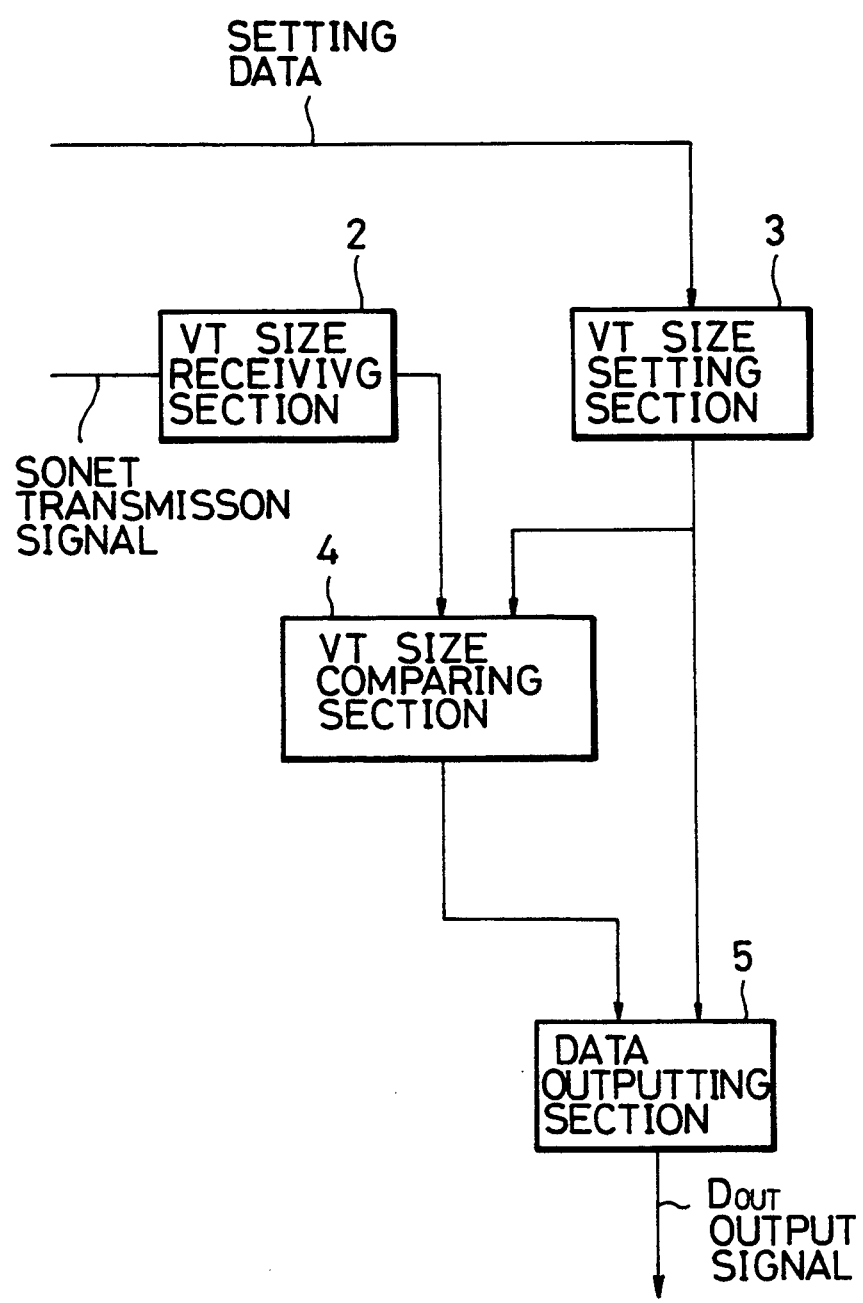
FIG. 8 is a block diagram of a SONET transmission signal processing apparatus showing a preferred embodiment of the present invention.

Referring first to FIG. 8 in which is shown a SONET transmission signal processing apparatus to which the present invention is applied, the SONET transmission signal processing apparatus includes a VT size receiving section 2, a VT size setting section 3, a VT size comparing section 4 and a data outputting section 5. The VT size receiving section 2 detects the first bytes included in a SONET transmission signal transmitted to the apparatus and detects the VT size of data included in the SONET transmission signal from data in the two predetermined bits of each first byte. The VT size setting section 3 sets the VT size desired by the user of the apparatus in response to setting data inputted from the outside by the user of the apparatus. The VT size comparing section 4 compares the VT size detected by the VT size receiving section 2 with the VT size set by the VT size setting section 3 to detect coincidence or noncoincidence. When the result of the comparison at the VT size comparing section 4 indicates coincidence, the data outputting section 5 executes predetermined data processing of data extracted from the received SONET transmission signal in accordance with the VT size set by the VT size setting section 3. When the result of the comparison at the VT size comparing section 4 indicates noncoincidence, error signal processing is executed instead of the predetermined data processing. The error signal processing may include, for example, adding alarm information (data comprising of all "1" or all "0") to an output signal $D_{OUT}$ of the data outputting section 5.

Figure 1:
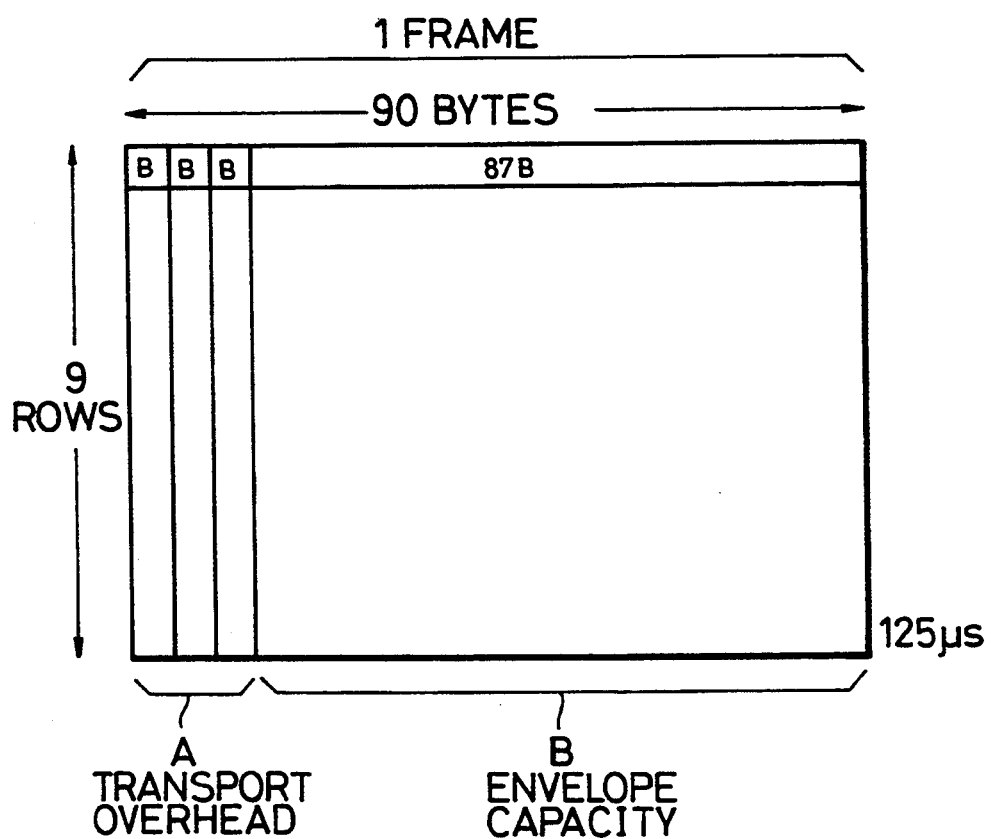
FIG. 1 is a diagrammatic view showing the structure of one frame of a SONET transmission signal.
Figure 2:
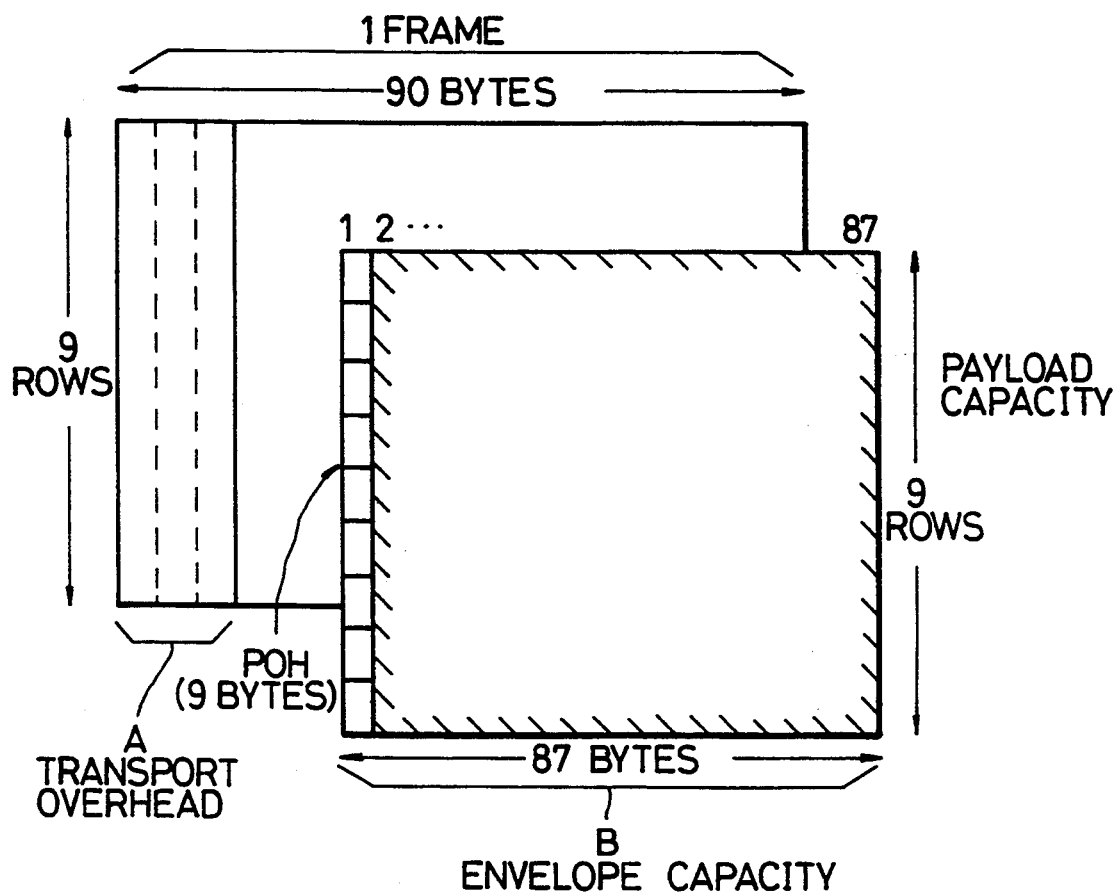
FIG. 2 is a diagrammatic view showing the structure of synchronization payload envelope capacity.
Figure 3:
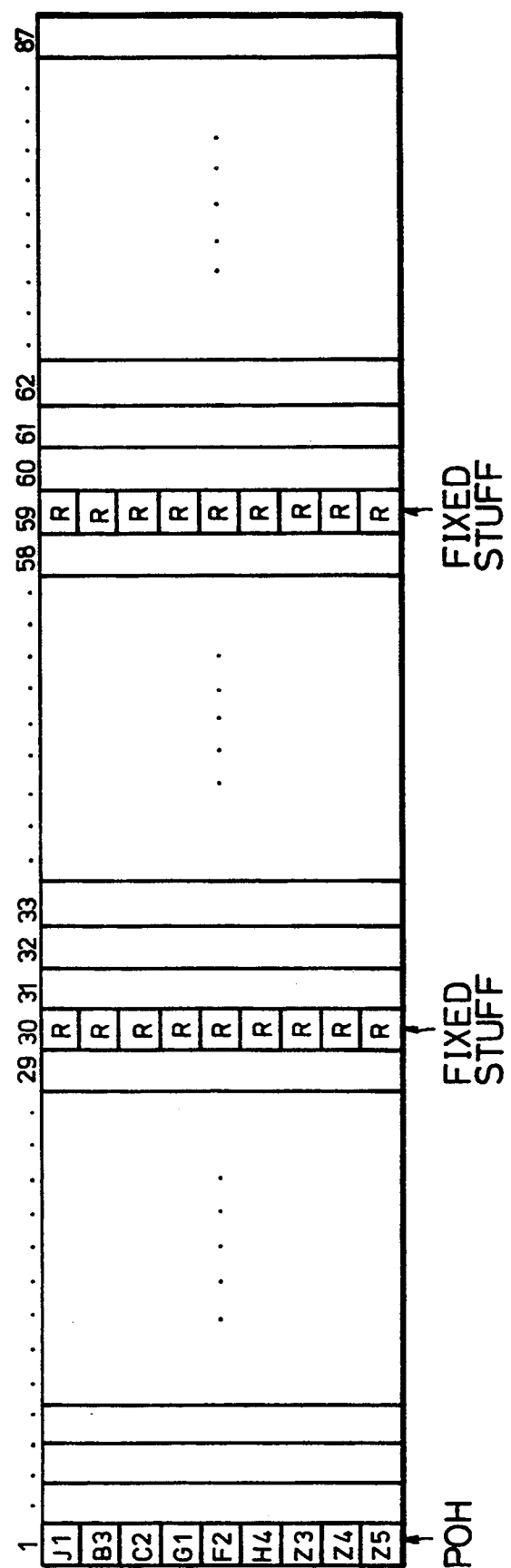
FIG. 3 is a diagrammatic view showing the positions of the fixed stuff accommodated within the synchronization payload envelope capacity.
Figure 4:
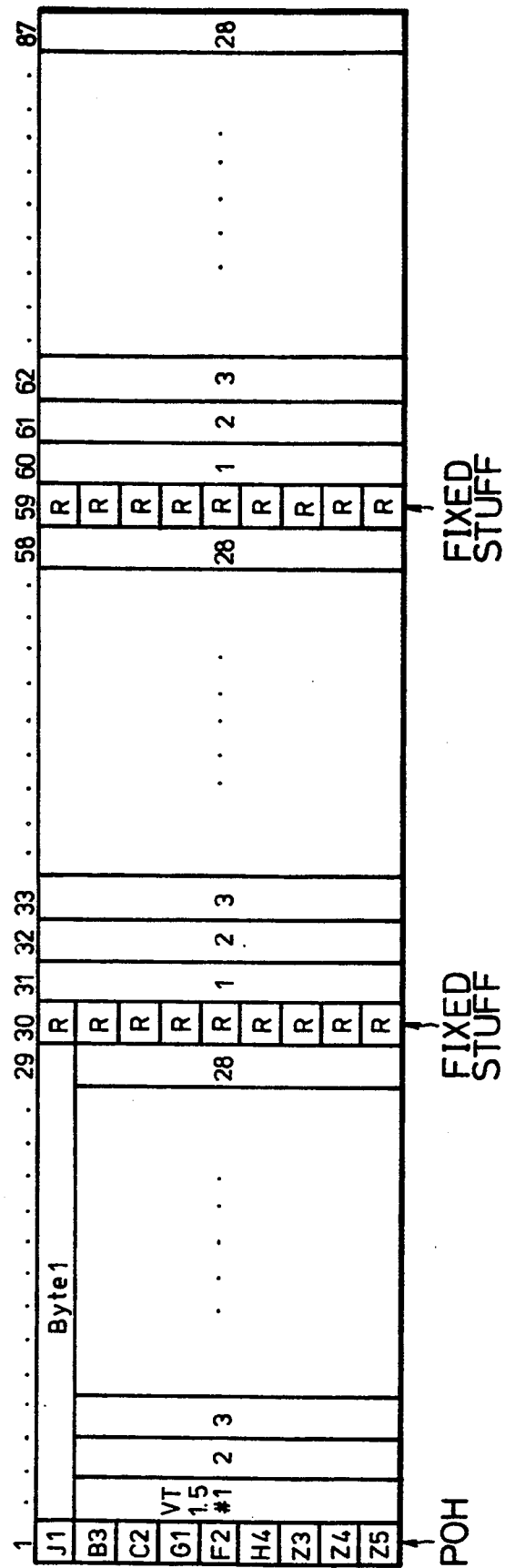
FIG. 4 is a similar view but illustrating the manner in which data is accommodated within the synchronization payload envelope capacity when the VT sizes of all data are equal to 1.5.
Figure 5:
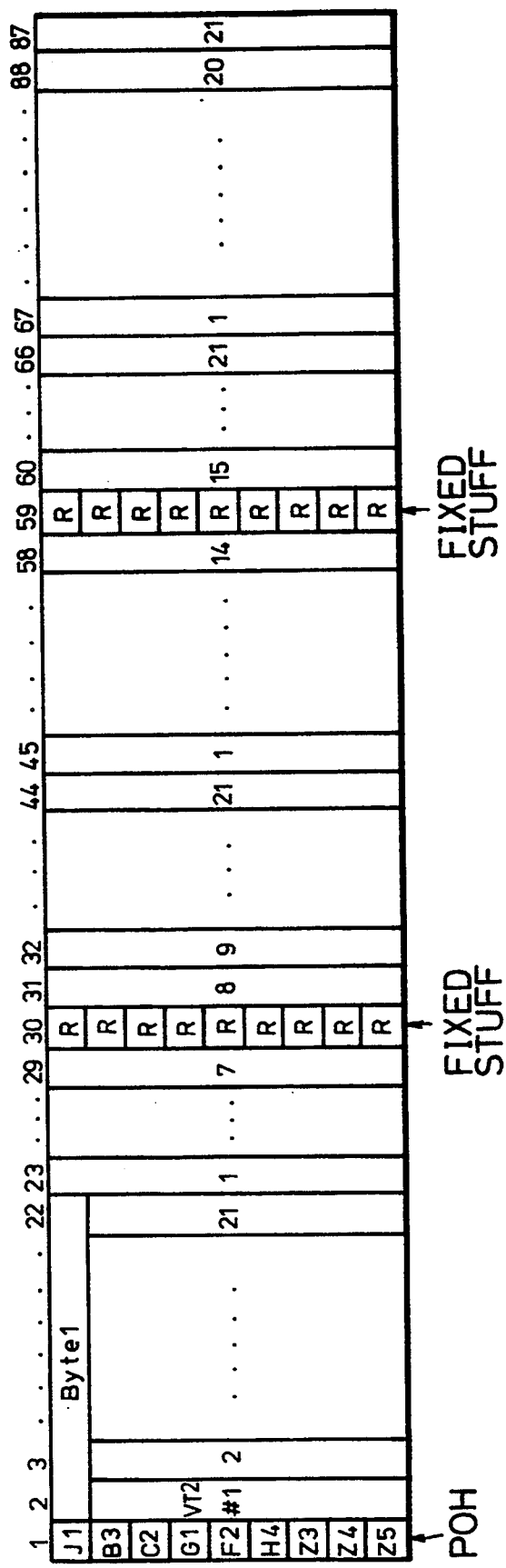
FIG. 5 is a similar view but illustrating another manner in which data is accommodated within the synchronization payload envelope capacity when the VT sizes of all data are equal to 2.
Figure 7:
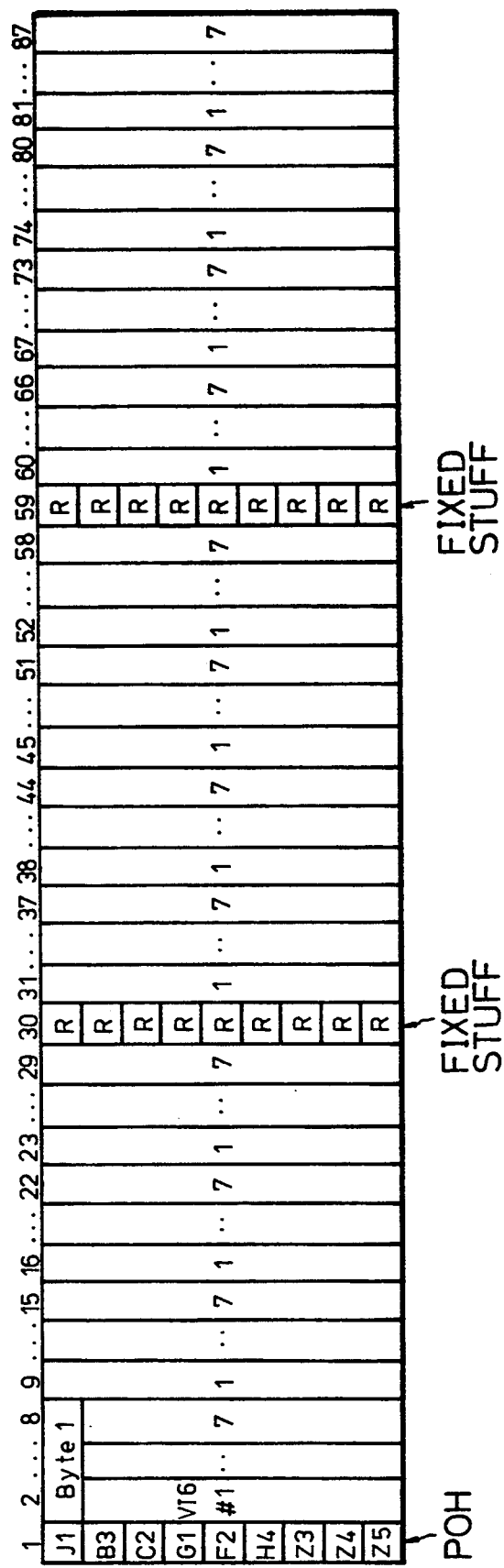
FIG. 7 is a similar view but illustrating a still further manner in which data is accommodated within the synchronization payload envelope capacity when the VT sizes of all data are equal to 6.

The detailed operations of the blocks of the SONET transmission signal processing apparatus will now be described taking as an example a case in which the user of the apparatus desires to operate the apparatus with a VT size of 1.5 and a SONET transmission signal is transmitted to the apparatus in which data of a VT size of 1.5 (shown in FIG. 4) is included.

The user of the apparatus will set the VT size at 1.5 at the VT size setting section 3 by inputting the setting data "11" to the VT size setting section 3 from the outside. The VT size receiving section 2 detects the J1 byte of the pass overhead (POH) included in the received SONET transmission signal for detecting the position of synchronization payload envelope capacity B, and then detects the data of the two predetermined bits of the first byte of the second column of synchronization payload envelope capacity B. The detected 2-bit data and the setting data "11" inputted to the VT size setting section 3 are both inputted to the VT size comparing section 4. If the 2-bit data detected at the VT size setting section 3 is equal to "11," the VT size comparing section 4 determines that the two values coincide and consequently outputs a signal indicative of coincidence to the data outputting section 5. As a result, the data outputting section 5 executes the predetermined data processing in accordance with the VT size of 1.5 of the data included in the second to the ninth rows of the second column of synchronization payload envelope capacity B. On the other hand, if the 2-bit data detected at the VT size setting section is a value other than "11," the VT size comparing section 4 determines that there is noncoincidence between the two inputted values and outputs a signal indicative of noncoincidence to the data outputting section 5. As a result, the data outputting section 5 executes the error signal processing of the data included in the second to the ninth rows of the second column of synchronization payload envelope capacity B. The error signal processing then may involve, for example, changing all data included in the second to the ninth rows of the second column of synchronization payload envelope capacity B into "1."

The operations described above are performed similarly for data of the third to 29th columns (i.e., the first unit) of synchronization payload envelope capacity B. It is to be noted that the results of comparison at the columns in the first unit are independent of and not influenced by each other. For example, when the result of comparison at the second column of synchronization payload envelope capacity B indicates noncoincidence but the result of comparison at the third column indicates coincidence, the error signal processing is executed for data included in the second to the ninth rows of the second column, but the predetermined data processing is executed for data included in the second to the ninth rows of the third column in accordance with a VT size of 1.5.

For data in the columns following the 31st column of synchronization payload envelope capacity B (i.e., the second unit and the third unit), the comparing operation at the VT size comparing section 4 is not performed because no group of first bytes is included in the data, but at the data outputting section 5, the following processing is executed in accordance with the result of the comparison for the first unit described above.

(1) For data of the 31st column (i.e., data of the first column of the second unit) and data of the 60th column (i.e., data of the first column of the third unit), the predetermined data processing is performed in accordance with a VT size of 1.5 when the result of comparison at the second column, which is the first column of the first unit, indicates coincidence. However, when the result of the comparison at the second column indicates noncoincidence, the error signal processing is executed.

(2) For data of the 32nd column (i.e., data of the second column of the second unit) and data of the 61st column (i.e., data of the second column of the third unit), when the result of comparison at the third column, which is the second column of the first unit, indicates coincidence, the predetermined data processing is executed in accordance with a VT size of 1.5. However, when the result of the comparison at the third column indicates noncoincidence, the error signal processing is executed.

(3) For data of the 33rd to 58th columns and from the 62nd to 87th columns, similar processing is executed.

For data of the columns following the 31st column of synchronization payload envelope capacity B, the results of the comparison at the columns in the first unit are independent of and not influenced by each other. For example, when the result of comparison at the second column of synchronization payload envelope capacity B indicates noncoincidence but the result of comparison at the third column indicates coincidence, the error signal processing is executed for data included in the 31st and 60th columns, but the predetermined data processing is executed in accordance with a VT size of 1.5 for data included in the 32nd and 61st columns.

Figure 9:
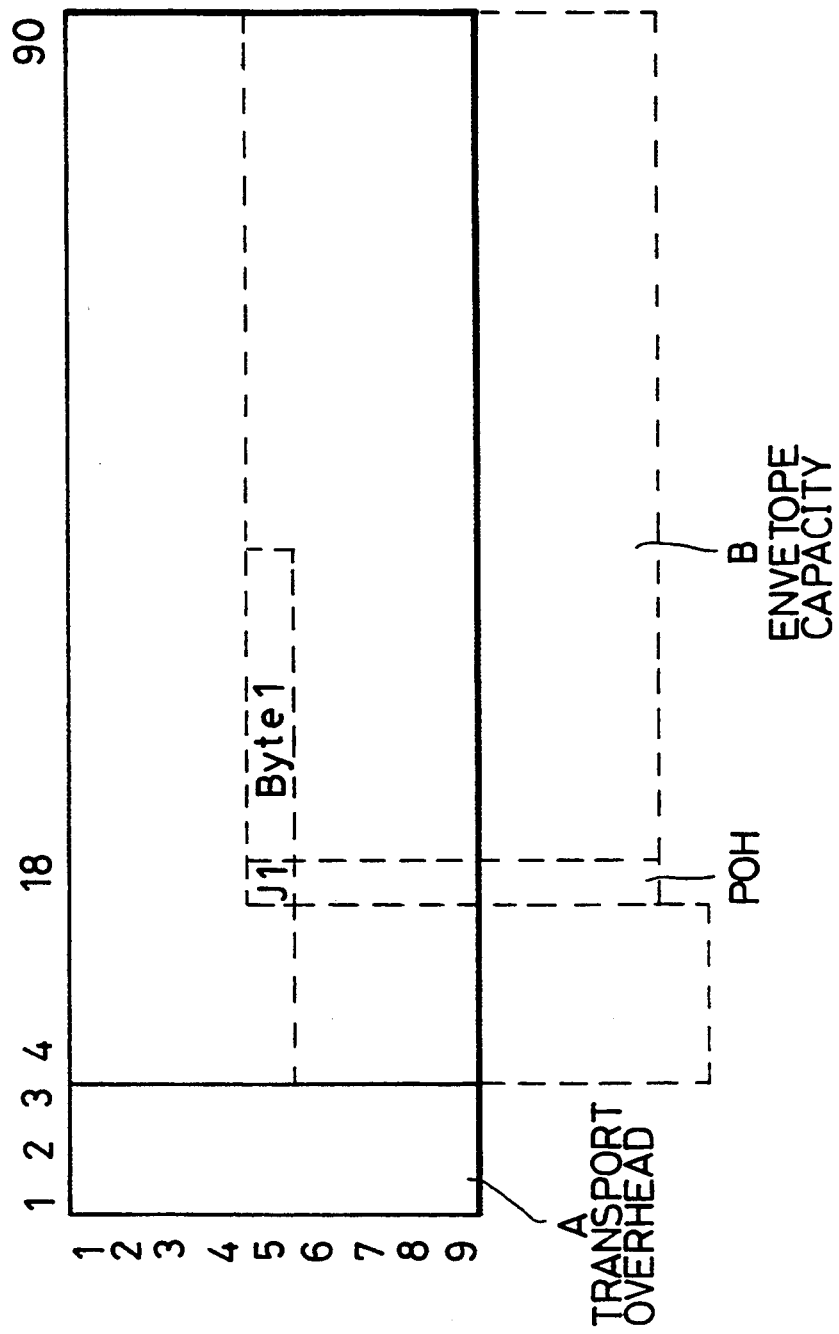
FIGS. 9 to 11 are diagrammatic views illustrating different steps of the operation of the VT size receiving section of the SONET transmission signal processing apparatus of FIG. 8 in which the J1 byte is positioned at the first row of the fourth column of one frame of a SONET transmission signal.

In the foregoing description, although the pass overhead (POH) is inserted into the first column of synchronization payload envelope capacity B, the pass overhead (POH) in an actual SONET transmission signal is floating with respect to the transport overhead A. Accordingly, a SONET transmission signal may be transmitted in which the pass overhead (POH) and synchronization payload envelope capacity B have a phase relationship such as illustrated in FIG. 9. In this instance, the following problems take place when the J1 byte is to be detected at the VT size receiving section 2.

(1) Since synchronization payload envelope capacity B does not have a fixed phase relationship to the information payload, it is impossible to determine the position of the first bytes in the frame based only on the frame phase of the SONET transmission signal.

(2) Even if the frame phase of the SONET transmission signal is determined and the position of the J1 byte is determined from the information received with the two predetermined bytes (H1 byte and H2 byte) of the pass overhead (POH), the frame phase of the SONET transmission signal will still have to be determined again because the values of the H1 byte and the H2 byte vary in accordance with the units of stuff.

Figure 10:
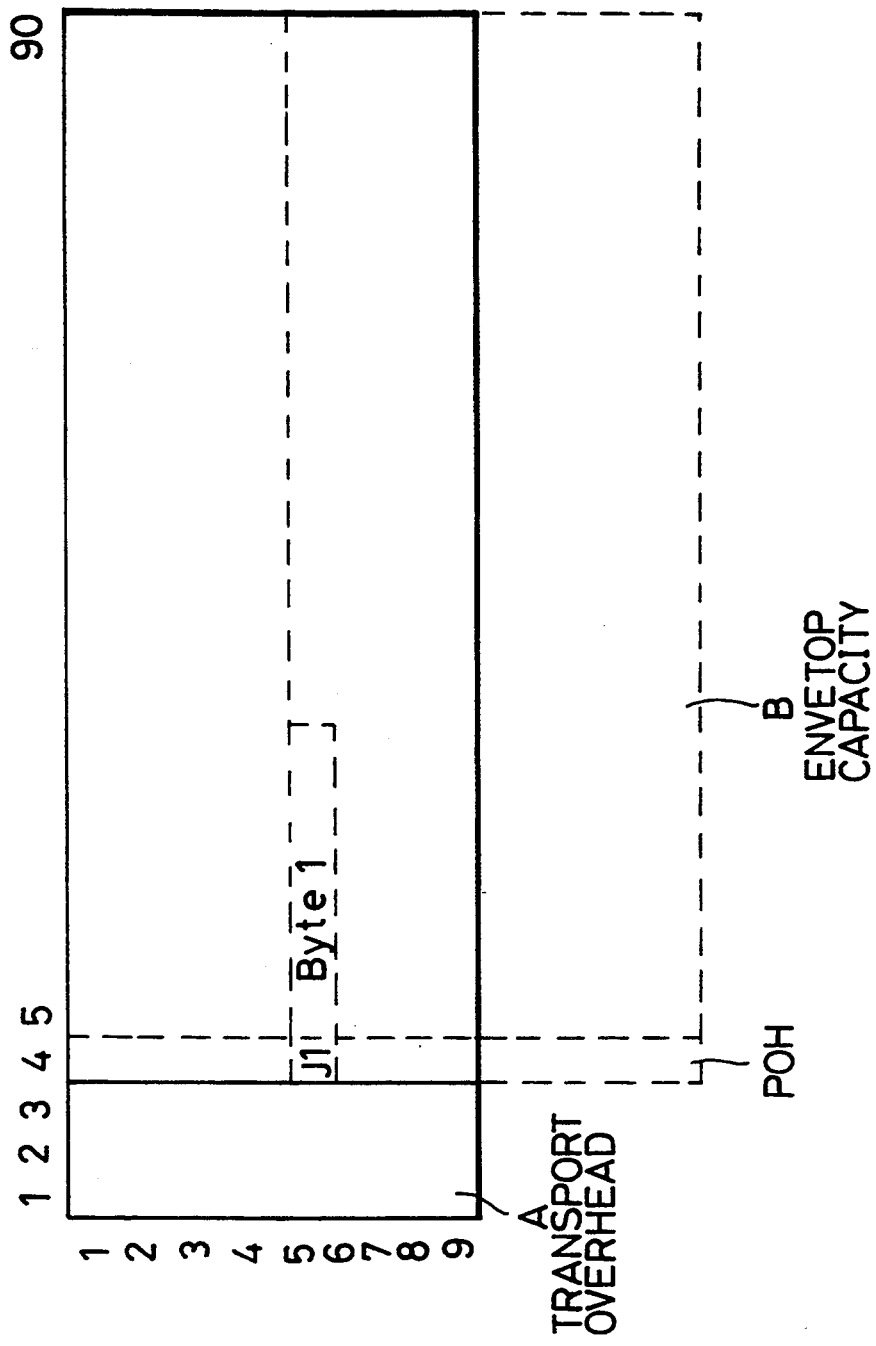
Figure 11:
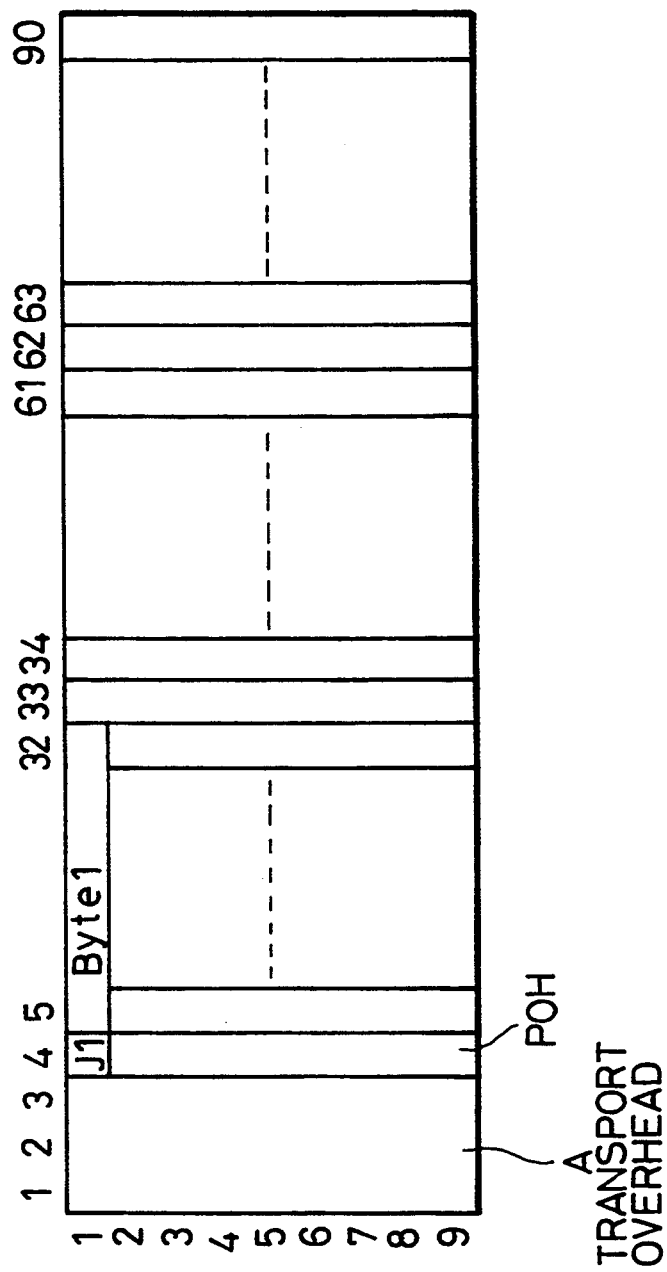

Accordingly, the VT size receiving section 2 executes the following operation so as to position the J1 byte at the first row of the fourth column of one frame of the SONET transmission signal. First, in order that synchronization payload envelope capacity B may have a predetermined phase relationship to the information payload, the entire synchronization payload envelope capacity B is delayed with respect to the information payload so that the pass overhead (POH) may be positioned at the fourth column of one frame of the SONET transmission signal as shown in FIG. 10. Subsequently, the J1 byte and the first bytes are positioned in the first row of the frame of the SONET transmission signal as shown in FIG. 11. This makes it possible to decisively determine the positions of the first bytes of the SONET transmission signal and also to detect the VT sizes of data included in the SONET transmission signal from the first bytes.

In the foregoing description, although data of the same VT size is accommodated in one frame of a SONET transmission signal, mixed data of different VT sizes may be accommodated in one frame of an actual SONET transmission signal. In addition, for a SONET transmission signal of the type just mentioned, comparison of the VT sizes described above is performed and similar signal processing of data is executed at the data outputting section 5. Thereafter, known time slot interchanging processing is performed for data outputted from the data outputting section 5 so that the positions of the columns are interchanged for data of the same VT sizes.

While this invention has been described in conjunction with preferred embodiments, it would now be possible for one skilled in the art to put this invention into practice in various other manners.

What is claimed is:

1. A method of processing a received SONET (Synchronous Optical Network) transmission signal having a synchronization payload envelope capacity which has a first column including data and a first byte which includes bits indicating a VT (Virtual Tributary) size of the data and a second column including only data, comprising the steps of:

setting a desired VT size,
detecting the first byte included in the first column,
detecting the VT size of the data included in the first column from the first detected byte,
comparing the detected VT size with the desired VT size, and executing a predetermined signal processing for the data included in the first column in accordance with the desired VT size when the step of comparing indicates coincidence between the detected VT size and the desired VT size but executing an error signal processing for the data included in the first column when the step of comparing indicates noncoincidence between the detected VT size and the desired VT size.

2. A SONET transmission signal processing method according to claim 1, which further comprises the steps of:

executing the predetermined signal processing for the data included in the second column in accordance with the desired VT size when the step of comparing with regard to the first column received prior to the second column indicates coincidence between the detected VT size and the desired VT size but executing the error signal processing for the data included in the second column when the step of comparing with regard to the first column received prior to the second column indicates noncoincidence.

3. A SONET transmission signal processing method according to claim 1 wherein the error signal comprises changing all of the data of the first column except for the first byte to "0" or "1."

4. A SONET (Synchronous Optical Network) transmission signal having a synchronization payload envelope capacity which has a first column including data and a first byte which include bits indicating a VT (Virtue Tributary) size of the data and a second column including only data, comprising:

VT size setting means for setting a desired VT size,
VT size detecting means for detecting the first byte included in the first column and determining the VT size of the data included in the first column from said first byte,
comparison means for comparing the VT size detected by the VT size detecting means with the desired VT size set by the VT size setting means, and
data outputting means for executing a predetermined signal processing for the data included in the first column in accordance with the desired VT size set by the VT size setting means when an output signal of the comparison means indicates coincidence between the detected VT size and the desired VT size, and for executing an error signal processing of the data included in the first column when the output signal of the comparison means indicates noncoincidence between the detected VT size and the desired VT size.

5. A SONET transmission signal processing apparatus according to claim 4, wherein the data outputting means executes the predetermined signal processing for the data included in the second column in accordance with the desired VT size set by the VT size setting means when the output signal of the comparison means with regard to the first column received prior to the second column indicates coincidence between the detected VT size and the desired VT size, but executes the error signal processing of the data included in the second column when the output signal of the comparison means with regard to the first column received prior to the second column indicates noncoincidence between the detected VT size and the desired VT size.

6. A SONET transmission signal processing apparatus according to claim 4, wherein the error signal processing comprises changing all of the data of the first column except for the first byte to "0" or "1".

7. A SONET transmission signal processing method according to claim 2, wherein the error signal processing comprises changing all of the data of the second column to "0" or "1."

8. A SONET transmission signal processing apparatus according to claim 5, wherein the error signal processing comprises changing all of the data of the second column to "0" or "1."

* * * * *